United States Patent
Corona et al.

(10) Patent No.: US 10,616,486 B2
(45) Date of Patent: Apr. 7, 2020

(54) VIDEO STABILIZATION

(71) Applicant: Ford Global Technologies, LLC, Dearborn, MI (US)

(72) Inventors: Enrique Corona, Canton, MI (US); Stephen Giardinelli, Warren, MI (US); Bruno Sielly Jales Costa, Santa Clara, CA (US); Mostafa Parchami, Dearborn, MI (US); Gintaras Vincent Puskorius, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/059,993

(22) Filed: Aug. 9, 2018

(65) Prior Publication Data

US 2020/0053286 A1 Feb. 13, 2020

(51) Int. Cl.
*H04N 5/232* (2006.01)
*G06T 7/20* (2017.01)
*G06T 7/73* (2017.01)

(52) U.S. Cl.
CPC ........... *H04N 5/23267* (2013.01); *G06T 7/20* (2013.01); *G06T 7/73* (2017.01); *H04N 5/23258* (2013.01)

(58) Field of Classification Search
CPC ........... H04N 5/23267; H04N 5/23258; H04N 5/23274; H04N 5/23264; H04N 5/23254; G06T 7/20–277; G06T 7/30–38; G06T 7/70–77
See application file for complete search history.

(56) References Cited

U.S. PATENT DOCUMENTS

| 8,120,661 | B2 | 2/2012 | Rabinowitz et al. |
| 8,947,529 | B2* | 2/2015 | Strine ............. G06T 7/20 |
| | | | 348/143 |
| 9,300,871 | B2 | 3/2016 | Zhou et al. |
| 9,716,832 | B2 | 7/2017 | Ryu et al. |
| 9,756,248 | B1 | 9/2017 | Wu et al. |
| 9,854,168 | B2 | 12/2017 | Wu et al. |
| 2016/0179093 | A1* | 6/2016 | Prokhorov ............ B60W 40/00 |
| | | | 701/2 |
| 2019/0258872 | A1* | 8/2019 | Kunze ..................... G01S 13/89 |

OTHER PUBLICATIONS

Jia et al., "Autonomous Vehicles Navigation with Visual Target Tracking: Technical Approaches", Dec. 15, 2008, Algorithms 2008, 1(2), pp. 153-182 (Year: 2008).*
Hajjawi et al., "Cooperative Visual Team Working and Target Tracking of Mobile Robots", 2002, IEEE, Proceedings of the Thirty-Fourth Southeastern Symposium on System Theory (Cat. No. 02EX540) (Year: 2002).*

* cited by examiner

*Primary Examiner* — Albert H Cutler
(74) *Attorney, Agent, or Firm* — Frank A. MacKenzie; Bejin Bieneman PLC

(57) ABSTRACT

A computing system can receive a stabilized image stream, wherein the stabilized image stream is drift-corrected based on determining that an input image stream is stable and then applying drift correction to maintain a stabilized field of view, wherein the field of view is stabilized with respect to the real world. The computing system can operate a vehicle based on determining at least one moving object in the stabilized image stream.

17 Claims, 11 Drawing Sheets

VIDEO STABILIZATION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
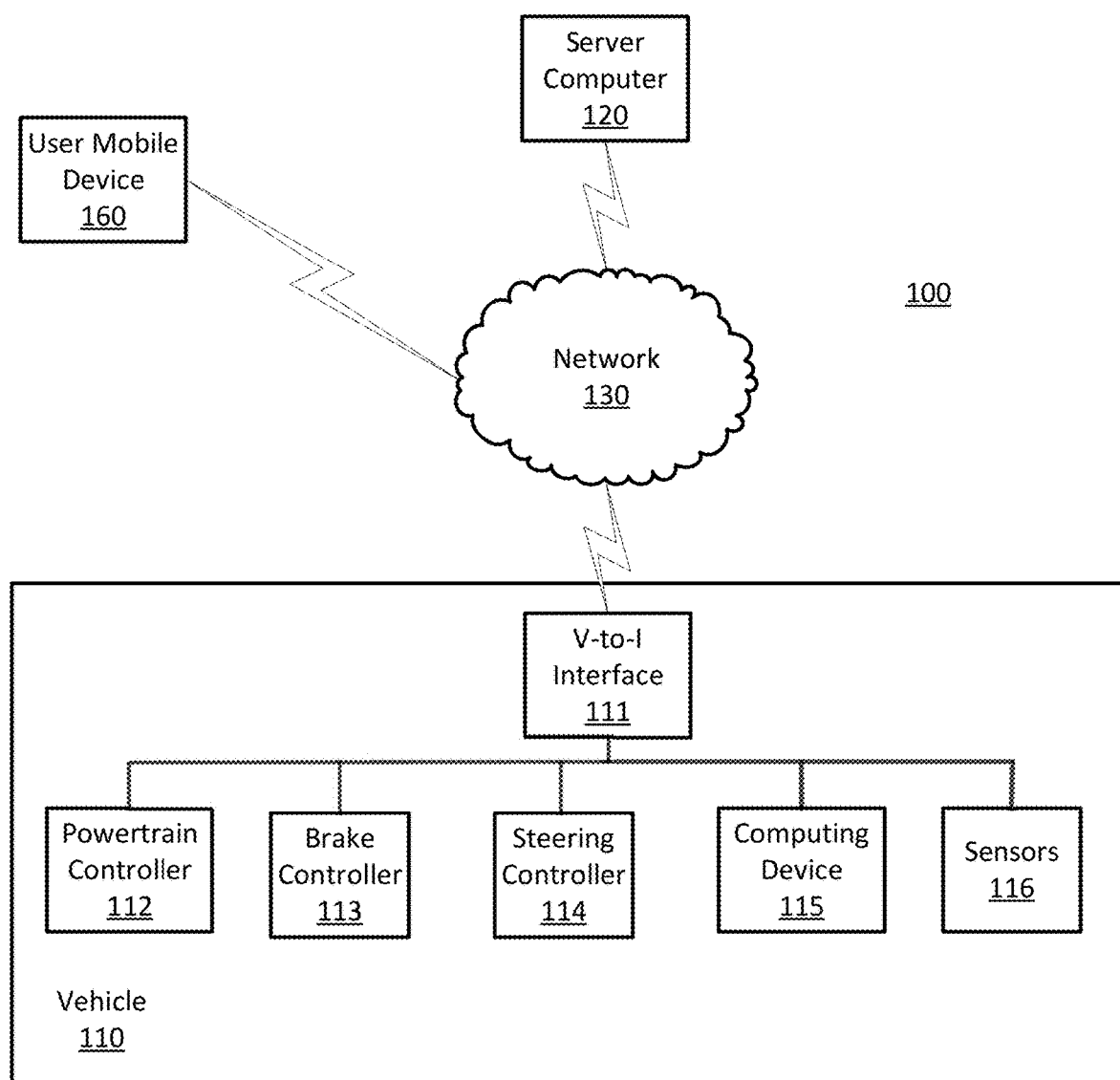
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine moving objects including vehicles and pedestrians in the vicinity of a vehicle and operate a vehicle based on the moving objects. For example, a computing device can detect and identify moving objects in the vicinity of a vehicle and, based on detecting and identifying moving objects at a plurality of time periods, determine a velocity, including speed and direction, for the moving objects. Thus, the computing device enjoys improved accuracy in analyzing sensor, e.g., image, data, and in identifying and determining trajectories of, moving objects.

Disclosed herein is a method, including receiving a video data stream, wherein the video data stream is drift-corrected based on determining that an input video data stream is stable and then applying drift correction to maintain a stabilized field of view, wherein the field of view is stabilized with respect to real world coordinates, and operating a vehicle based on determining at least one moving object in a stabilized image stream. When the input video data stream is stable can be determined based on determining an eccentricity $\varepsilon_k$ at a time k and comparing the eccentricity $\varepsilon_k$ to an empirically determined threshold value, where eccentricity $\varepsilon_k$ measures a rate at which data points associated with a pixel location $x_k$ of the input image stream are changing as a function of time k. The eccentricity $\varepsilon_k$ can be based on recursively processing the input video data stream based on an empirically determined constant $\alpha$, an input video data stream data point at time k $x_k$, a mean of $x_k$ at time k $\mu_k$, and variance of $x_k$ at time k $\sigma_k^2$. The moving object can be determined in the stabilized video data stream based on determining eccentricity $\varepsilon_k$ and comparing eccentricity $\varepsilon_k$ to a constant proportional to $\alpha$. Eccentricity $\varepsilon_k$ can be determined based on recursively updating mean $\mu_k$ based on a previous mean $\mu_{k-1}$ and weighted video data stream data points $\alpha x_k$ that assign decreasing weights to older video data stream data points $x_k$.

Eccentricity $\varepsilon_k$ can be determined based on recursively updating variance $\sigma_k^2$ for video data stream data points based on the constant $\alpha$, the input video data stream data point $x_k$, and the mean $\mu_k$. Operating the vehicle based on determining at least one moving object in the video data stream can include determining a 3D location of the moving object with respect to the vehicle.

The video data stream can be acquired by a stationary video camera and determining the 3D location of the moving object with respect to the vehicle includes determining a location and a direction of the stationary video camera with respect to the vehicle. Determining a location and a direction of the stationary video camera with respect to the vehicle can include determining a 3D pose of the stationary video camera. At least one moving object can be determined in a stabilized image stream based on locating the moving object in a cognitive map. The cognitive map can be determined based on the location of the vehicle, map data, vehicle sensor data and the moving objects. The vehicle can be operated based on a path polynomial based on the cognitive map. The video data stream can be acquired by a video camera included in the vehicle. The vehicle can be operated by controlling vehicle steering, braking, and powertrain.

Further disclosed is a computer readable medium, storing program instructions for executing some or all of the above method steps. Further disclosed is a computer programmed for executing some or all of the above method steps, including a computer apparatus, programmed to receive a video data stream, wherein the video data stream is drift-corrected based on determining that an input video data stream is stable and then applying drift correction to maintain a stabilized field of view, wherein the field of view is stabilized with respect to real world coordinates, and operate a vehicle based on determining at least one moving object in a stabilized image stream. When the input video data stream is stable can be determined based on determining an eccentricity $\varepsilon_k$ at a time k and comparing the eccentricity $\varepsilon_k$ to an empirically determined threshold value, where eccentricity $\varepsilon_k$ measures a rate at which data points associated with a pixel location $x_k$ of the input image stream are changing as a function of time k the eccentricity $\varepsilon_k$ can be based on recursively processing the input video data stream based on an empirically determined constant $\alpha$, an input video data stream data point at time k $x_k$, a mean of $x_k$ at time k $\mu_k$, and variance of $x_k$ at time k $\sigma_k^2$. The moving object can be determined in the stabilized video data stream based on determining eccentricity $\varepsilon_k$ and comparing eccentricity $\varepsilon_k$ to a constant proportional to $\alpha$. Eccentricity $\varepsilon_k$ can be determined based on recursively updating mean $\mu_k$ based on a previous mean $\mu_{k-1}$ and weighted video data stream data points $\alpha x_k$ that assign decreasing weights to older video data stream data points $x_k$.

The computer apparatus can be further programmed to determine eccentricity $\varepsilon_k$ based on recursively updating variance $\sigma_k^2$ for video data stream data points based on the constant $\alpha$, the input video data stream data point $x_k$, and the mean $\mu_k$. Operating the vehicle based on determining at least one moving object in the video data stream can include determining a 3D location of the moving object with respect to the vehicle. The video data stream can be acquired by a stationary video camera and determining the 3D location of the moving object with respect to the vehicle includes determining a location and a direction of the stationary video camera with respect to the vehicle. Determining a location and a direction of the stationary video camera with respect to the vehicle can include determining a 3D pose of the stationary video camera. At least one moving object can be determined in a stabilized image stream based on locating the moving object in a cognitive map. The cognitive map can be determined based on the location of the vehicle, map data, vehicle sensor data and the moving objects. The vehicle can be operated based on a path polynomial based on the cognitive map. The video data stream can be acquired by a video camera included in the vehicle. The vehicle can be operated by controlling vehicle steering, braking, and powertrain.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing device, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
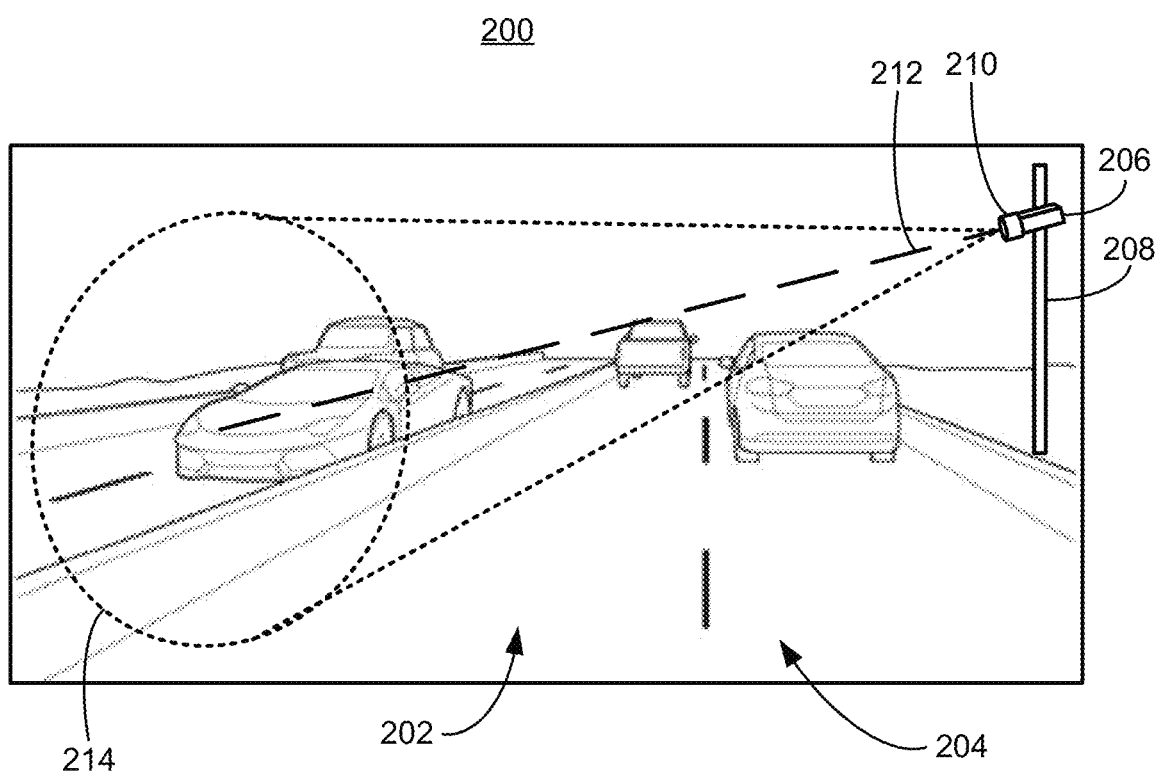
FIG. 2 is a diagram of an example stationary video camera.

FIG. 2 is a diagram of an example color image 200 of a traffic scene, rendered in black and white to comply with to comply with 37 C.F.R. § 1.84(a)(1). This example color image 200 includes a roadway 202 and traffic objects 204. Traffic objects can include vehicles, pedestrians, bicycles, animals or debris, etc. Color image 200 also includes a stationary video camera 206, which can be mounted on a pole 208 or any other appropriate structure including traffic signals or buildings. Stationary video camera 206 has a lens 210 having a field of view 214, represented by dotted lines, and an optical axis 212, represented by a dashed line. The field of view 214 can be represented by a magnification of lens 210, combined with an optical axis 212, defined as a direction in 3D space located at a 3D location of an optical center of lens 210. Optical axis 212 can represent the center in 3D space of field of view 214.

Field of view 214 determines the portion of 3D space captured in an image, i.e., a digital image, by stationary video camera 206, and thereby acquired as a color video image by stationary video camera 206. The 3D location and pose of stationary video camera 206, where 3D location is defined by x, y, z coordinates with respect to latitude, longitude and altitude and pose is defined by p, $\phi$, $\theta$ angles of rotation with respect to axes defined by latitude, longitude and altitude, can be determined empirically. Based on determining the 3D location and pose of stationary video camera 206, the field of view 214 can be determined.

Because the field of view 214 of stationary video camera 206 does not change, real world 3D distances from stationary video camera 206 to real world background locations can be determined by physically measuring the real world 3D location of objects such as roadways represented in a color video image acquired by stationary video camera 206, for example. Other techniques for determining real world 3D locations of objects include photogrammetry, where a priori information regarding the size of an object can be used to determine the real world 3D location of the object in relation to the stationary video camera. Once the real world 3D locations of objects within the field of view of stationary video camera 206 are determined, the 3D locations can be assigned to pixel coordinates (i, j) in a color video image, for example. The 3D location information can be stored at a computing device included in a traffic infrastructure system 100.

Stationary video camera 206 can be part of the traffic infrastructure system 100. A "traffic infrastructure system" as that term is used herein includes a network of computing devices and sensors that acquire data regarding vehicle traffic in areas that include roadways and portions of roadways and communicate with vehicles included in the vehicle traffic. A traffic infrastructure system 100 can include communications networks and computing devices that monitor and direct vehicle traffic over areas such as cities, neighborhoods, districts, or highways, for example. A traffic infrastructure system 100 can include sensors, like stationary video camera 206, to record video data of traffic and process the video data and transmit it to computing devices in communication with many stationary video cameras 206, for example, which can use the video data of traffic to determine traffic patterns and rates. Traffic infrastructure system 100 also can include wireless communications equipment that permits the traffic infrastructure system 100 to form ad-hoc networks with a vehicle 110 based on location in a geographic area defined by the traffic infrastructure system. A traffic infrastructure system 100 can include a plurality of transmitting and receiving stations, for example, and manage the ad-hoc networks in the same fashion as cellular telephone networks manage cell phone communications. For example, a traffic infrastructure system 100 can include communications from a server 120 with a vehicle 110 using V-to-I interface 111 whenever vehicle 110 was within range of traffic infrastructure system 100, e.g., communications elements included in the network 130, wherein "within range" is defined as the area within which vehicle 110 can receive a usable signal from a traffic infrastructure system 100 transceiver. Such communications can be according to the Dedicated Short Range Communications (DSRC) protocol and/or the like.

Stationary video camera 206 can acquire a color video data stream including color video images of traffic scenes in a field of view 214. For example, a color video data stream can be processed to determine foreground and background objects and regions in a color video data stream and output as an image that includes regions identified as background and regions identified as foreground, where a background region is a portion of the image the includes pixel locations where the pixel values do not change from color video image to color video image included in the video stream data. Foreground regions include pixel locations where the pixel values change from color image to color image in the video stream data.

Determining foreground and background objects in a color video image 300 can be used by a traffic infrastructure system 100 for a variety of tasks including traffic flow analysis, pedestrian tracking, and vehicle 110 operation, for example. Foreground and background objects in a color video image 300 can be determined by acquiring and storing a first color video image 300 at computing device 115. A second color video image 300 can be acquired and the first color video image 300 subtracted from the second color video image 300. The subtracted result image contains zeros at pixel locations where the data did not change between the first and second color video images 300 and non-zero values at pixel locations that did change. The non-zero values are caused by moving or foreground objects in the second color video image 300 causing non-zero pixel values. Non-moving or background objects are subtracted out of the result image, leaving only the foreground objects formed by connected regions of non-zero pixels.

Simple background subtraction can separate foreground pixels from background pixels; however, changing light levels and other changes in appearance of the background can require that a new background image be acquired. Knowing when to acquire a new background image can be difficult if the scene includes moving vehicles, for example. Other techniques for foreground/background can rely on thresholds or other empirically determined parameters that can require adjustment to track changing conditions. Techniques discussed herein calculate an eccentricity ε of the pixels of a stream of color video images and thereby determine foreground and background pixels in a result image derived from the stream of color video images without requiring adjustment to track changing conditions.

A stream of color video images can be defined as a plurality of color video images acquired by a color video camera at successive time intervals.

Calculation of eccentricity ε based on an input stream of color video images can be performed more efficiently by a computing device than other techniques discussed above to determine image foreground/background. For example, calculation of eccentricity ε based on an input stream of color video images can be performed at a rate of hundreds of color video images per second on readily available computing devices. Advantageously, calculation of eccentricity ε is free of complex user-defined parameters and free of prior assumptions about the data and its distribution.

Eccentricity ε is a metric, i.e., value determined as explained below, that indicates how different a pixel is from past samples of the same pixel location. Regarding a set of samples of the same pixel location as a vector of variables in n-dimensions, the value of eccentricity ε increases as these variables deviate from their "normal" behavior. For foreground detection, all "abnormal" or "anomalous" pixels are labeled as foreground, based on the intensities of the pixels. The eccentricity ε at time instant k can be given by the equation:

$$\varepsilon_k = \alpha + \frac{\alpha(x_k - \mu_k)^T (x_k - \mu_k)}{\sigma_k^2} \qquad (1)$$

where α is a user input dimensionless constant (usually a small value, e.g., 0.005) that represents a learning rate for the background model, wherein learning rate indicates what portion of the eccentricity $\varepsilon_k$ is based on the current pixel $x_k$, and therefore how quickly the eccentricity $\varepsilon_k$ can adapt to changes in the input video data stream, for example, and where current pixel $x_k$ is a vector that includes the intensities of a video data stream sample at a time k. Variables $\mu_k$ and a are the mean and variance of the current pixel $x_k$ at time instant k, recursively updated according to equations:

$$\mu_k = (1-\alpha)\mu_{k-1} + \alpha x_k \qquad (2)$$

$$\sigma_k^2 = (1 - \alpha)\sigma_{k-1}^2 + \frac{\alpha(x_k - \mu_k)^T (x_k - \mu_k)}{1 - \alpha} \qquad (3)$$

A pixel $x_k$ is determined to be a foreground pixel when the calculated eccentricity $\varepsilon_k$ at time instant k is higher than 5α.

Eccentricity $\varepsilon_k$ images can include foreground regions having grayscale values (eight-bit grayscale, for example) on a background of pixels with value zero. Foreground regions are determined based on applying equations (1), (2), and (3) to a color video data stream of color video images. Foreground pixels in eccentricity $\varepsilon_k$ image determined by equations (1), (2), and (3) can be grouped into foreground regions by determining connected regions of foreground pixels, where foreground pixels are determined to be connected when they are 8-way adjacent, which includes diagonally adjacent. Foreground regions can represent objects that are moving against a background, for example vehicles or pedestrians on or near a roadway.

Traffic infrastructure systems 100 can include a plurality of stationary video cameras 206 providing eccentricity $\varepsilon_k$ images, e.g., to a plurality of computing devices via the network 130. For example, computers 115 in a respective plurality of vehicles 110 can receive eccentricity $\varepsilon_k$ images. Software programs included in the plurality of computing devices 115 can identify, based on information regarding the location, pose and field of view of each stationary video camera 206 and the location, speed and direction of travel of each vehicle 110, one or more specific eccentricity $\varepsilon_k$ images that are relevant to the respective vehicles 110. A computing device 115 in each vehicle 110 can then download, via the network 130, only those eccentricity $\varepsilon_k$ images determined to be relevant to the respective vehicle 110, thereby minimizing network bandwidth consumption. Each stationary video camera 206 can include information along with the eccentricity $\varepsilon_k$ image that identifies the location, pose, and field of view of the stationary video camera 206 that acquired the eccentricity $\varepsilon_k$ image.

Figure 3:
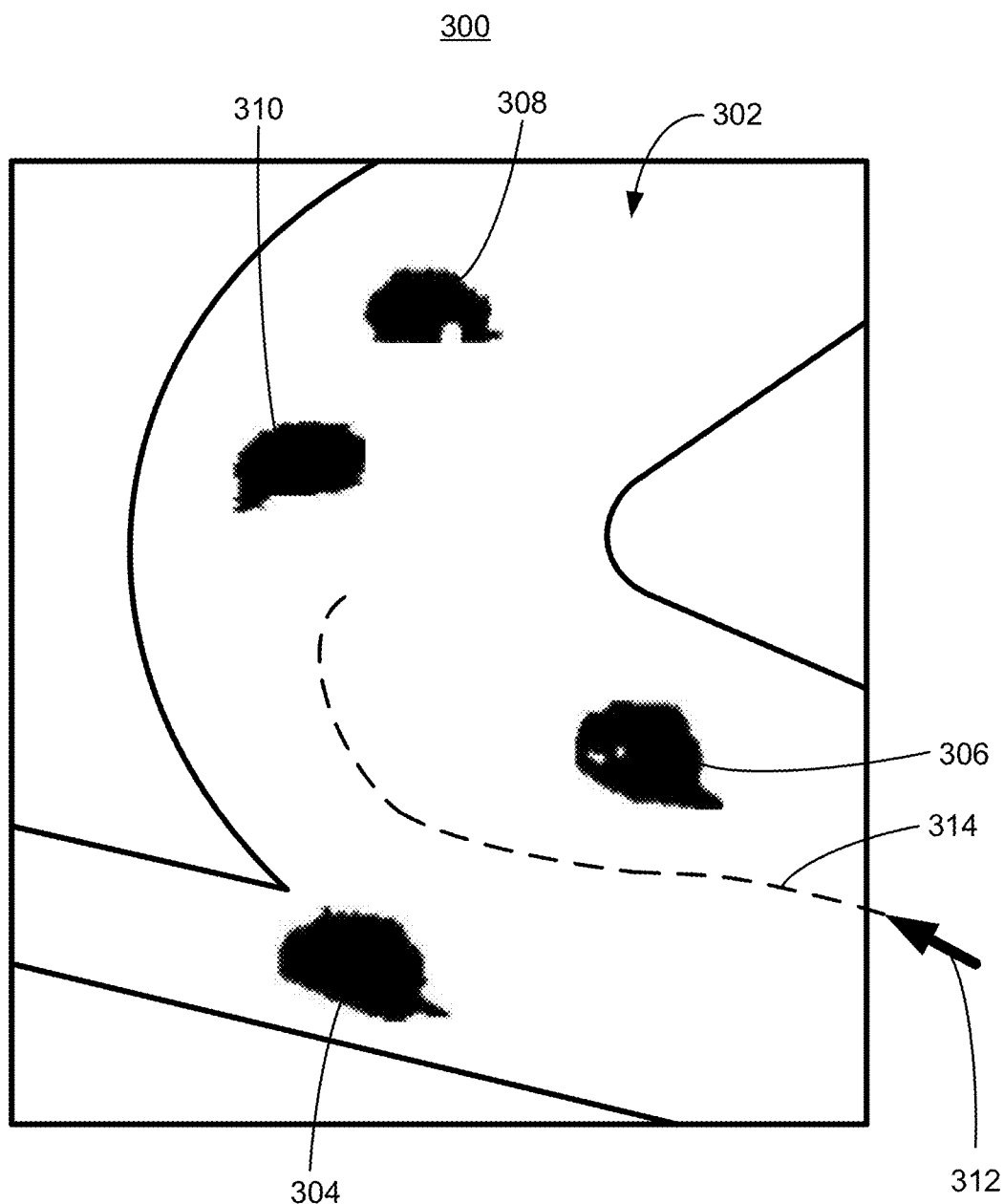
FIG. 3 is a diagram of an example cognitive map including moving objects acquired by a stationary video camera.

FIG. 3 is an example cognitive map 300 determined by computing device 115 in vehicle 110 based on an eccentricity $\varepsilon_k$ image and stationary video camera 206 3D location data downloaded from a traffic infrastructure system. A cognitive map is a representation of a local spatial environment that specifies locations of objects in the environment relative to one another. As discussed above in relation to FIG. 3, 3D location data can be used to determine the real-world 3D locations of objects in a cognitive map 300 based on projecting the pixel coordinates (i, j) of foreground objects from an eccentricity $\varepsilon_k$ image onto the cognitive map 300.

In the example of FIG. 3, cognitive map 300 is a top-down view of a local spatial environment that includes regions and objects relevant to vehicle 110 navigation including a roadway 302 and vehicles 304, 306, 308, 310. A cognitive map 300 can be determined based on information regarding the location and direction of travel of a vehicle 110 and stored map data. For example, vehicle 110 can be located at, and traveling in the direction indicated by, arrow 312. Because cognitive map 300 is constructed based on real-world 3D coordinates, real-world 3D locations of objects from an eccentricity $\varepsilon_k$ image can be located in cognitive map 300. Computing device 115 can input vehicle 110 location and direction of travel and determine features of cognitive map 300 including roadway 302 based on downloaded or stored map information and data from vehicle sensors 116. For example, a lidar sensor 116 can measure distances that confirm the presence of roadway 302.

Computing device 115 can include information regarding foreground regions 304, 306, 308, 310 from an eccentricity $\varepsilon_k$ image downloaded from a traffic infrastructure system in a cognitive map 300. Because the stationary video camera 206 has included information regarding the 3D location, pose and field of view along with an eccentricity $\varepsilon_k$ image, computing device 115 can project foreground regions (vehicles) 304, 306, 308, 310 onto cognitive map 300 by determining where the pixels of the foreground regions 304, 306, 308, 310 intersect roadway 302 based on the pixel coordinates (i, j) of the foreground regions 304, 306, 308, 310 in eccentricity $\varepsilon_k$ image and the real-world 3D location of background pixel locations including roadway 302. By projecting foreground regions 304, 306, 308, 310 onto appropriate locations in cognitive map 300, foreground regions 304, 306, 308, 310 can be identified by computing device 115 based on location, size and shape, and used by computing device 115 to determine a path upon which to operate vehicle 110 on roadway 302 that avoids foreground regions 304, 306, 308, 310. By tracking foreground regions 304, 306, 308, 310 in a series of cognitive maps 300 based on eccentricity $\varepsilon_k$ images acquired at successive time instants, a speed and direction can be determined for each foreground regions 304, 306, 308, 310 and used by computing device 115 to determine locations for moving objects in cognitive map 300 and thereby determine a path for vehicle 110 to travel on roadway 302 that avoids a collision or near-collision with moving objects foreground regions 304, 306, 308, 310.

Computing device 115 can operate vehicle 110 based on a path polynomial specifying a path 314 (dashed line) determined, at least in part, on moving objects based on foreground regions 304, 306, 308, 310. A path polynomial is a mathematical representation of real world 3D location and motion including rates of change of lateral and longitudinal accelerations, for example. Computing device 115 can determine a path polynomial 115 based on a current location, speed and direction for vehicle 110, represented by arrow 312. Computing device can then determine a polynomial function of degree three or less in segments called splines, wherein the segments are constrained to fit smoothly together by constraints on first derivatives to represent predicted successive locations of vehicle 110. Constraints on path polynomial 314 in real-world 3D coordinates include upper and lower limits on lateral and longitudinal accelerations and upper limits on rates of change of lateral and longitudinal accelerations (jerk) required to operate vehicle 110 along path polynomial 314. Path polynomial 314 can also be constrained to stay in roadway 302 and to avoid moving objects based on foreground regions 304, 306, 308, 310 while maintaining target speeds, for example. Computing device 115 can operate vehicle 110 to travel along a path 314 according to a determined path polynomial by sending commands to controllers 112, 113, 114 to control steering, brakes and powertrain of vehicle 110 to cause vehicle 110 to travel along the path 314 on a roadway 302 while avoiding moving objects based on foreground regions 304, 306, 308, 310.

Computing device 115 can determine a path polynomial for a path 314 based on stored map data, location data from vehicle sensors 116 including GPS and accelerometers, radar, lidar and video sensors. Computing device 115 can process data from radar, lidar and video sensors to determine objects in fields of view based on each of the radar, lidar and video sensors using machine vision techniques including neural networks and Bayesian statistics, for example. Using information based on the fields of view of each sensor 116, the objects can be located in a cognitive map 300. Computing device can then determine a path polynomial in cognitive map 300 that permits vehicle 110 to travel to a destination while avoiding collision or near-collision with the objects by estimating free space regions and non-free space regions included in cognitive map 300. Free space regions are regions of a cognitive map 300 in which a vehicle 110 can be predicted to travel unimpeded on a roadway surface.

Computing device 115 can determine destinations in cognitive map 300 for vehicle 110 travel that will be a step in accomplishing a higher-level goal-directed activity like picking up a passenger and dropping them at a destination, for example. Non-free space regions included in a cognitive map 300 can include non-roadway regions and regions surrounding objects, both fixed objects like traffic cones and barriers, and, when objects are determined to be moving, locations to which the objects are likely to move, for example predicting travel for vehicles, pedestrians and cyclists. Locations in a cognitive map 300 to which the objects are likely to move can be determined based on repeated observations of the objects over time, for example, to determine object location probabilities based on determined object speed and direction. Path polynomials 312 can be determined to direct vehicle 110 to travel within a free space region to reach a destination while avoiding non-free space regions. Data, and therefore detected objects, from vehicle sensors 116 including radar, lidar and video sensors are limited to the fields of view of each of the radar, lidar and video sensors. Adding data regarding moving objects based on foreground regions 304, 306, 308, 310 to a cognitive map 300 can improve the cognitive map 300 by including objects in addition to objects visible in the fields of view of vehicle sensors 116.

Figure 4:
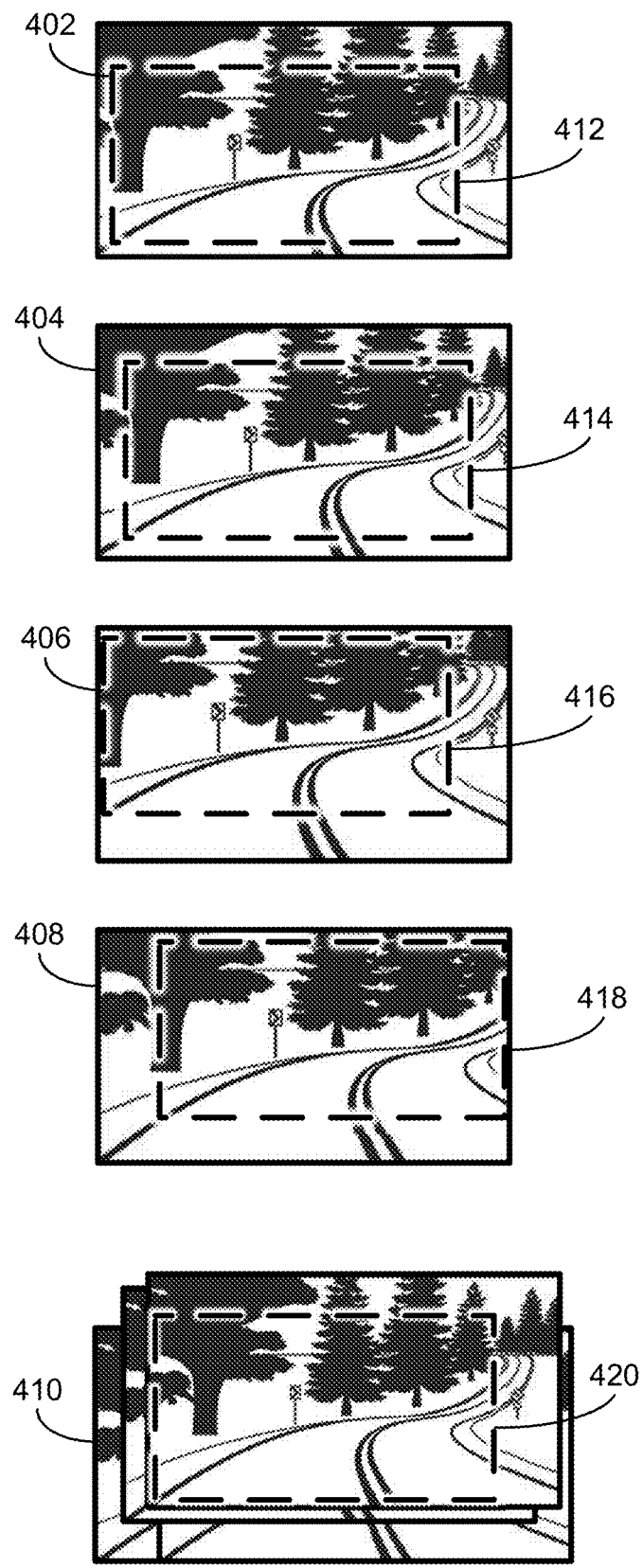
FIG. 4 is a diagram of four example video images and one composite video image.

FIG. 4 is a diagram of four example frames 402, 404, 406, 408 of color video image data rendered in black and white to conform to regulations from video stream data acquired by a stationary video camera 206 and montage 410 of superimposed frames 402, 404, 406, 408. A stationary video camera 206 is subject to motion induced by noise factors like wind and traffic vibrations. This motion will alter the 3D direction of field of view 214 of stationary video camera 206 thereby altering the portion of the real-world traffic scene acquired as video stream data by stationary video camera 206. Frames 402, 404, 406, 408 of video stream data illustrate the effect of motion on a stationary video camera 206 as frames 402, 404, 406, 408 are being acquired. Dashed rectangles 412, 414, 416, 418, 420 indicate the portions of frames 402, 404, 406, 408 of video stream data, respectively, that are included all of the frames 402, 404, 406, 408 of video stream data. Montage 410 of frames 402, 404, 406, 408 of video stream data illustrates how movement of a stationary video camera 206 can affect the location of a field of view 214 and consequently the location of pixel data in a frame 402, 404, 406, 408 of video stream data.

Movement of stationary video camera 206 and consequent movement in the location of pixel data in frames 402, 404, 406, 408 of video stream data can cause foreground detection software programs calculating eccentricity $\varepsilon_k$ to fail by detecting movement of the entire image, rather than just moving object in the image, for example. Motion of stationary video camera 206 can be detected and compensated for using inter-frame video stabilization, wherein a number of frames 404, 406, 408 of video stream data are aligned with a first frame 402 of video stream data by selecting a number of portions of the first frame 402 of video stream data up to the entire first frame 402 and finding a displacement in x and y pixel coordinates that causes the first frame 402 to achieve the closest pixel-wise match with subsequent frame 404, 406, 408, based on the summed absolute values of pixel differences between the frames. The displacements can be accumulated as each frame is matched in turn to maintain the alignment with the first frame 404.

Displacements from a first frame 402 to a second frame 404 can be determined by homography, which means finding similarities between images. An example of homography is performing region-wise matching using normalized correlation. For example, extracting one or more sample regions from a first frame 402 and using the sample region to perform normalized correlation with the second frame 402 to determine the location of the region from first frame 402 within the second frame 404 to within sub-pixel accuracy. This technique assumes that the image data displacement is translational; i.e., it is also assumed that there is no rotation or skewing of the data. Once the displacement in x and y pixel coordinates is known, the second frame 404 can be translated to align exactly with the first frame. A second displacement can be determined by comparing a third frame 406 to the second frame 404. Aligning each frame of video data to an immediately previous frame is referred to as instantaneous compensation. In addition to performing instantaneous compensation, the second displacement can be added to the first displacement to align the third frame 406 to the first frame 404. As new displacements are calculated for subsequent frames, each new displacement can be added to the current sum of displacements, permitting computing device 115 to align each frame with the first frame 404. This is referred to as accumulation of displacements and permits computing device 115 to maintain a full field of view in spite of only having complete data in portions of frames 402, 404, 406, 408 of video stream data. In this fashion, geometric measurements on the video stream data including foreground detection that depend upon real-world locations can remain accurate in spite of motion of stationary video camera 206.

Figure 5:
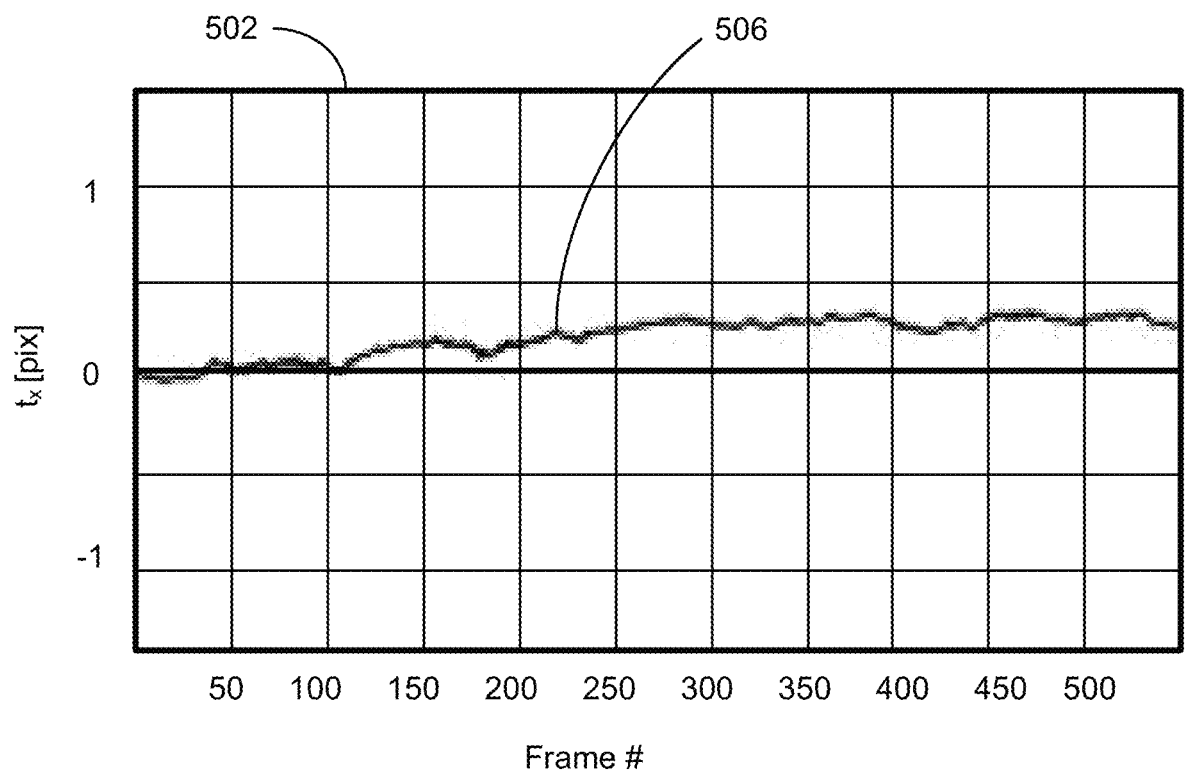
FIG. 5 is a diagram of two example graph of stationary video camera vibration.
Figure 5:
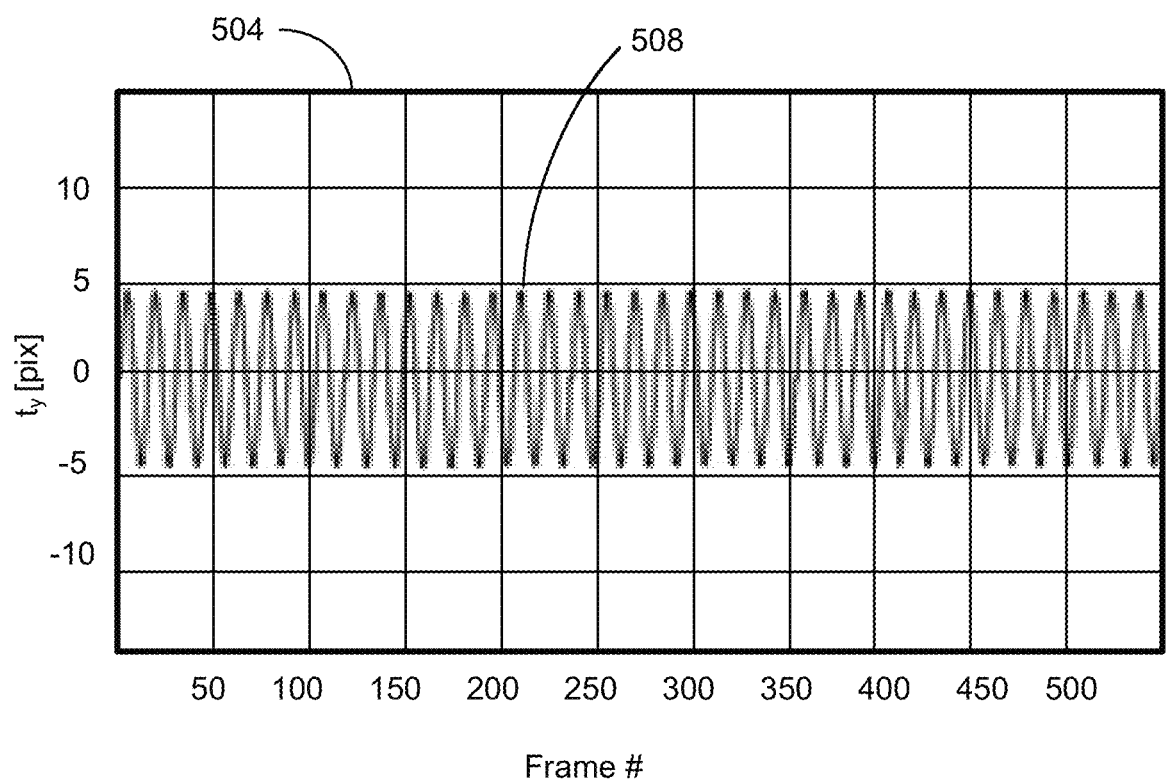

FIG. 5 are diagrams of example graphs 502, 504 of stationary video camera 206 motion. Stationary video camera motion can be determined by measuring the location of features, like edges, for example, in video stream data and graphing the change in location of the features as a function of time, where time is represented by video frame numbers, where a video frame rate can be 60 frames per second, for example. Graph 502 represents the change in x-location of image data measured in pixels $t_x$[pix] on the Y-axis and frame number Frame # on the X-axis. Graph 504 represents the change in y-location of image data measured in pixels $t_y$[pix] on the Y-axis and frame number Frame # on the X-axis.

Graphs 502, 504 illustrate the effect of image stabilization based on accumulating displacements when a periodic motion is introduced parallel to image data Y-axis, and Gaussian noise to both axes, as shown by image Y-axis data 508, where displacement of image Y-axis data 508 oscillates about zero. Image X-axis data 506 in graph 502 illustrates a systematic error or drift introduced in the image X-axis data 506 by errors in instantaneous compensation accumulating as displacements are accumulated. Graph 502 illustrates an accumulated error of about 0.5 pixels after about 17 seconds of image stabilization. Drift introduced by systematic errors in image stabilization can lead to inaccuracies in real-world measurements based on the video stream data where stationary video camera 206 field of view 214 is used to process video stream data, including foreground/background detection.

Figure 6:
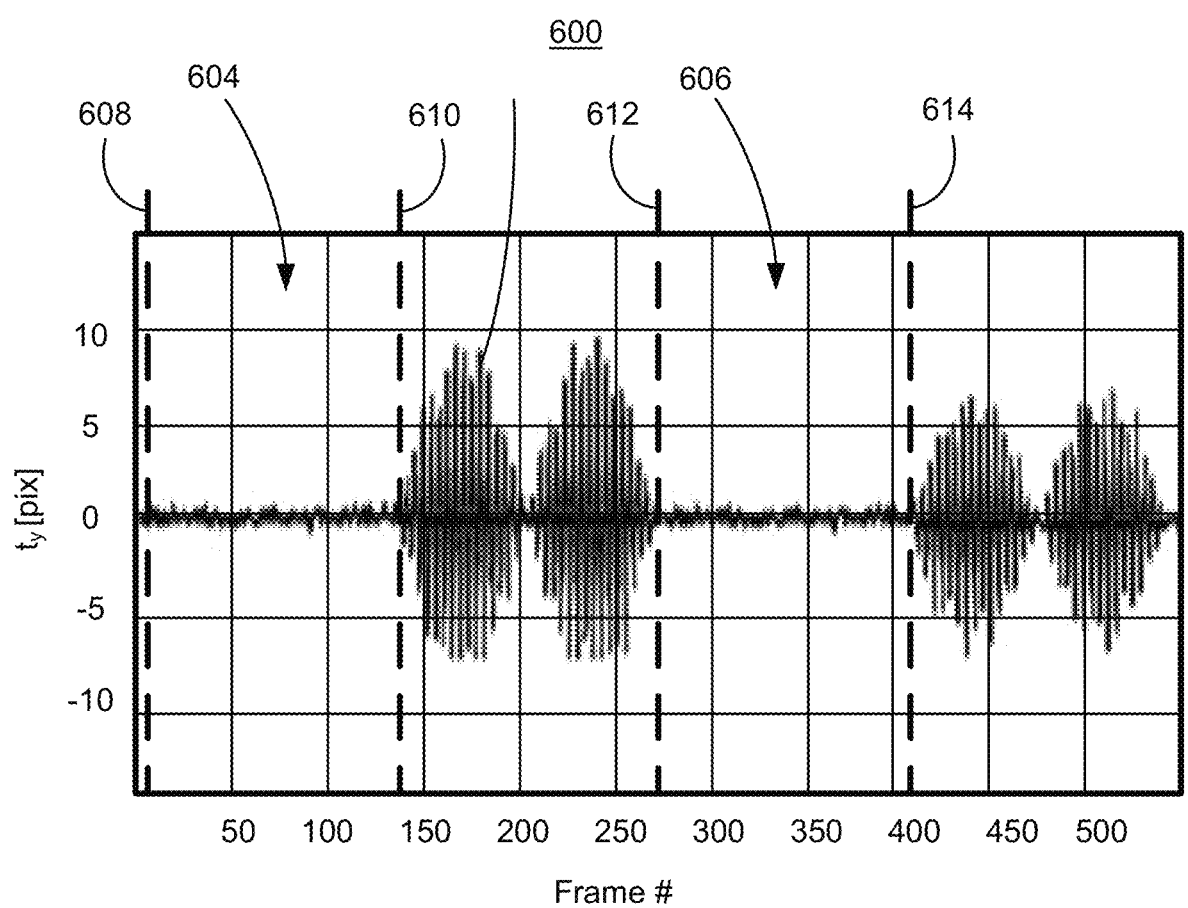
FIG. 6 is a diagram of an example graph of stationary video camera vibration.

FIG. 6 is a diagram of an example graph 600 that represents image Y-axis data 602 in pixels $t_y$[pix] on the Y-axis and frame number Frame # on the X-axis for a stationary video camera 206 mounted on a pole 208. Mounting a stationary video camera 206 on a pole 208 subject to motion due to noise factors like wind and traffic vibrations can introduce recognizable structure to image Y-axis data 602. For example, a stationary video camera 206 can typically be mounted on a cantilever arm attached to the pole 208. Cantilever mounting a stationary video camera 206 can introduce structure as illustrated by image Y-axis data 602, where stable regions 604, 606, demarked by dotted lines 608, 610, 612, 614, respectively indicate only small (<+/− 0.5 pixels) displacements introduced by Gaussian noise. Stable regions 604, 606 are interspersed with non-stable regions, where non-zero (>+/−1.0 pixels) oscillatory motion of image Y-axis data 602 occurs. This structure in image Y-axis data 602 is introduced by using a cantilever pole 218 mount for stationary video camera 206.

Assume the initial reference (e.g. calibrated) frame was acquired when stationary video camera 206 was in a stable region 602, 604. As the stationary video camera 206 acquires frames at a given frame rate, image stabilization software programs can stabilize the video stream data based on accumulating instantaneous compensations. If the camera enters a stable region, the instantaneous compensations (e.g.

translations) should be very small. In a perfect situation (e.g. the instantaneous compensation is exact, so the accumulated error is zero) the stabilization algorithm should output accumulated compensations which are zero because the camera is motionless. In other words, the current frame would be perfectly aligned to the first frame 404, therefore nothing needs to be compensated for. In a real situation, due to error building up in time, it is likely that the accumulated estimations have amassed a non-trivial error. Therefore, the overall compensation would be off by a non-trivial amount which approximates the accumulated error representing the accumulated instantaneous compensation drift illustrated by image x-axis data 506 in graph 502.

Figure 7:
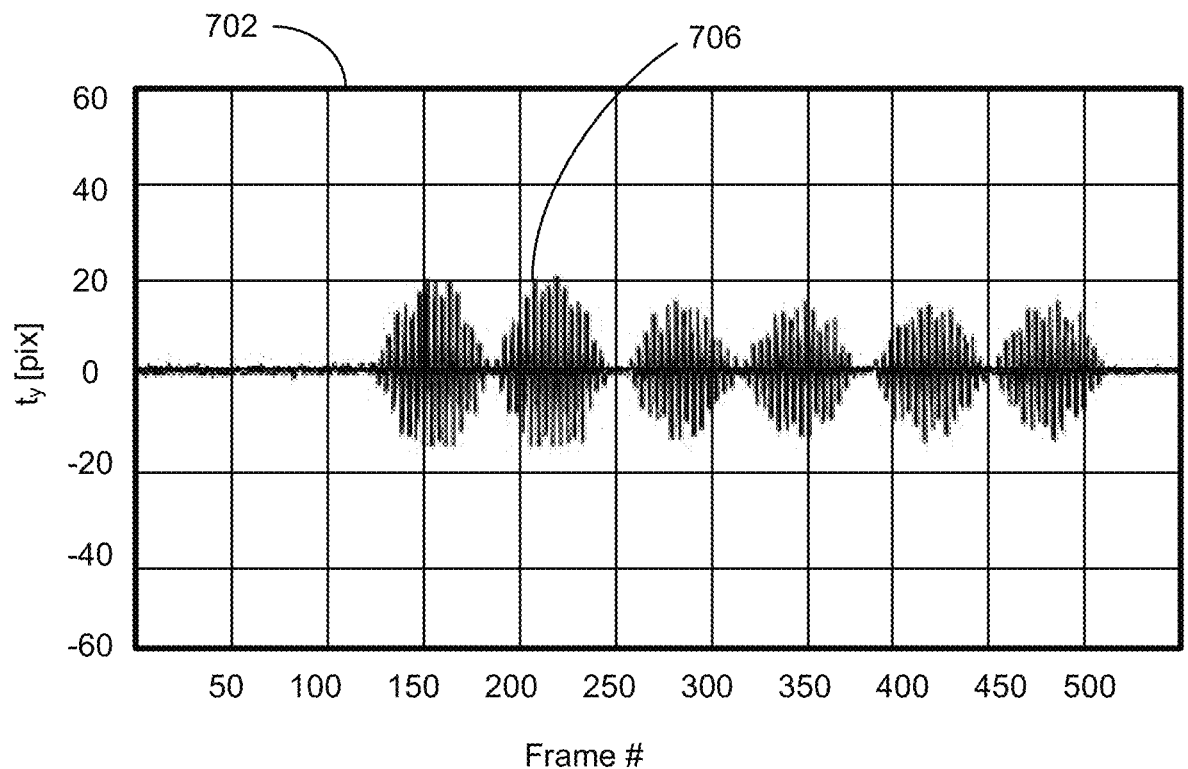
FIG. 7 is a diagram of two example graphs of stationary video camera vibration.
Figure 7:
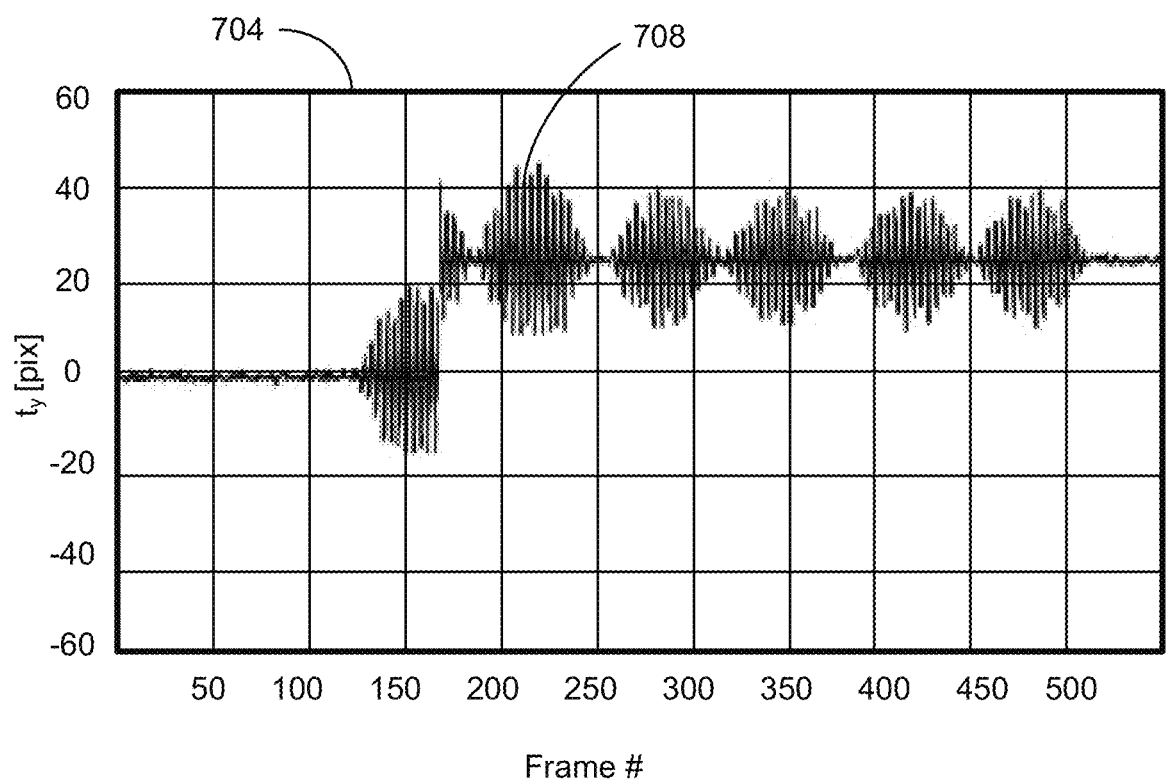

FIG. 7 is a diagram of two example graphs 702, 704 of image Y-axes data 706, 708, respectively. In graph 702, image Y-axis data 706 represents instantaneous compensation in the image Y-axis for video stream data. In graph 704, image Y-axis data represents accumulated instantaneous compensation including drift. Image Y-axis data 706 and image Y-axis data 708 were generated by adding horizontal and vertical modulated oscillations, sudden illumination changes, and some translational Gaussian noise to video stream data. There is a very noticeable error in the estimation of the instantaneous compensation at about frame #170 which causes the accumulated compensation to drift about 30 pixels. By comparing the accumulated compensation with the instantaneous one during a stable region, one can get a quick approximation of the drift accrued up to that point, according to equation:

$$\text{Drift} \approx \text{Comp}_{Accumulated}^{Stable} - \text{Comp}_{Instantaneous}^{Stable} \quad (4)$$

where $\text{Comp}_{Accumulated}^{Stable}$, and $\text{Comp}_{Instantaneous}^{Stable}$ are the accumulated and instantaneous compensations read during a stable region, respectively. A better drift approximation can be determined by computing the running average of the accumulated compensations and reading that value only during the stable regions, $$\text{Drift}^n \approx \frac{(n-1)}{n}\text{Drift}^{n-1} + \frac{1}{n}\text{Comp}^n_{Accumulated}, (n>0) \quad (5)$$

where n represents the index of the current frame, and $\text{Comp}_{Accumulated}^n$ is the value of the accumulated compensation at the nth frame. The running average is reset (i.e. set n=0) every time its value is read.

Techniques discussed herein improve calculation of foreground/background images as discussed above in relation to FIGS. 2 and 3, by improving the accuracy of video stream data by detecting and correcting drift in image stabilized video stream data with an efficient, non-parametric, recursive approach to detect anomalies in video stream data called typicality and eccentricity data analysis (TEDA) that is determined based on the estimated instantaneous compensations. TEDA uses a user input threshold to determine if a sample frame motion should be considered an anomaly or a typical observation. In this example, an anomaly is any change in video image data related to noise factors like wind and vibrations from traffic, etc. These noise factors cause oscillatory motion in the image Y-axis direction. Stable image Y-axis data 706. 708 is determined by lack of anomalous observations above the threshold. Any anomalous observation above the threshold indicates non-stable image Y-axis data 706, 708.

Figure 8:
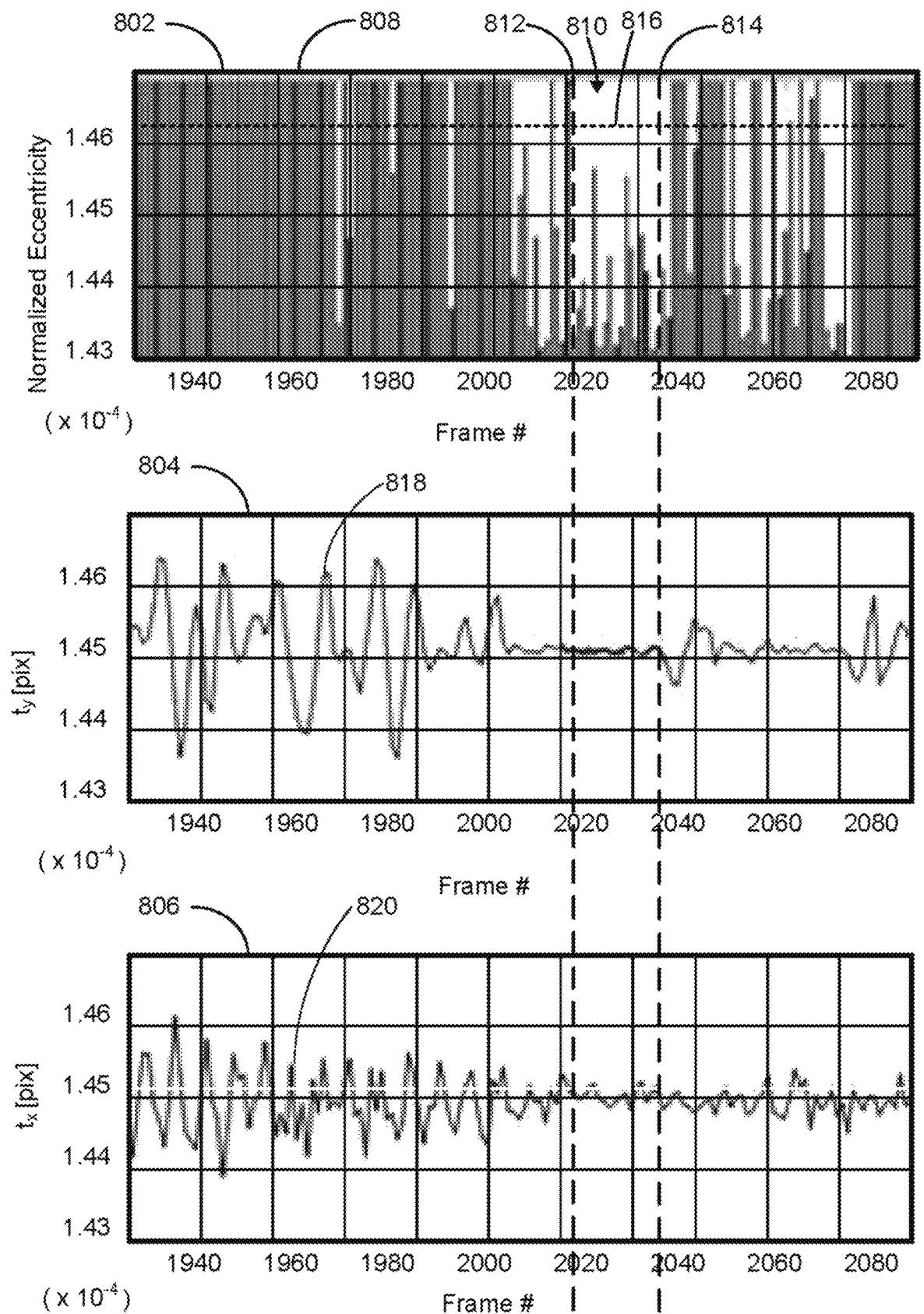
FIG. 8 is a diagram of three example graphs of normalized eccentricity and stationary video camera vibration.

FIG. 8 is a diagram of a three example graphs 802, 804, 806 of normalized eccentricity 808, image X-axis data 818, and image Y-axis data 820 for video stream data processed as described above to determine normalized eccentricity ε. Graph 802 plots normalized eccentricity, calculated by determining eccentricity ε as described above in relation to equation (3), above and dividing by the number of pixels per image. TEDA detects a stable region of graph 802 by measuring normalized eccentricity ε per frame against a user input threshold 816 (dotted line). If normalized eccentricity ε stays below the threshold for a sufficient number of consecutive frames, a stable region 810 that includes the consecutive frames is determined. Dashed lines 814, 812 illustrate stable region 810. Graphs 804 and 806 plot image X-axis data 818 and image Y-axis data 820 vs. time in frame #'s, respectively. Stable region 810 is shown with reference to graphs 804 and 806 to demonstrate that detection of stable region 810 based on normalized eccentricity ε corresponds to regions of little or no movement (<+/−0.1 pixel) in either X or Y directions during stable region 810. During stable region 810 computing device 115 can measure drift as illustrated in graph 704 of FIG. 7 and can then apply a drift correction factor calculated as a fraction of the measured drift. In this fashion the drift can be gradually corrected without jumps or sudden changes, since the amount of drift correction per frame does not exceed a fraction of a pixel, settable by user input. Because drift is corrected in this fashion, correcting drift in stabilized video stream data can be performed without short-term effect on foreground/background detection or other processing based on geometry of features in stabilized video stream.

Figure 9:
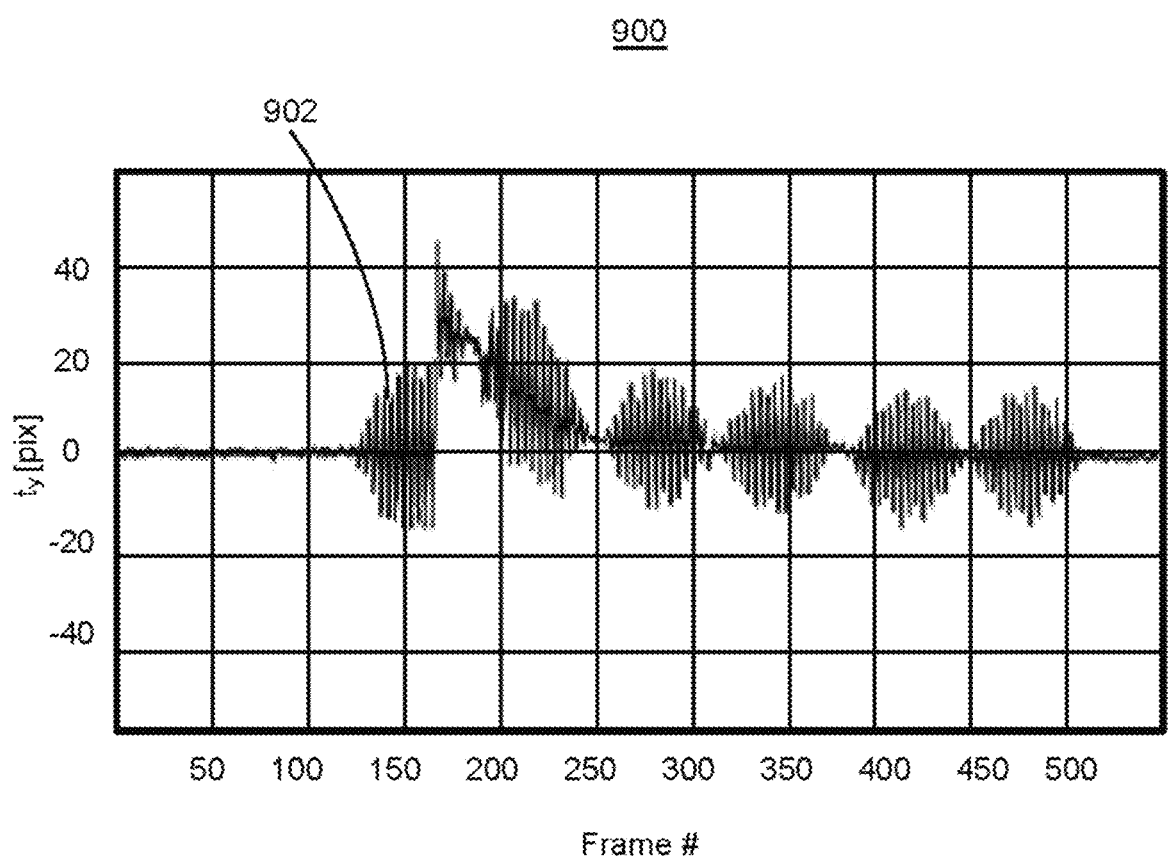
FIG. 9 is a diagram of an example graph of stationary video camera vibration.

FIG. 9 is a diagram of an example graph 900 of image Y-axis data 902 based on accumulated instantaneous compensation exhibits drift of about 30 pixels introduced at about frame #170. In this example drift correction based on normalized eccentricity ε can return the image Y-axis data 902 of accumulated instantaneous compensation to an average value of zero after about frame #250, thereby correcting drift in image Y-axis data 902. Compare this to graph 704 of FIG. 7, where the average value of image Y-axis data 708 does not return to zero.

Figure 10:
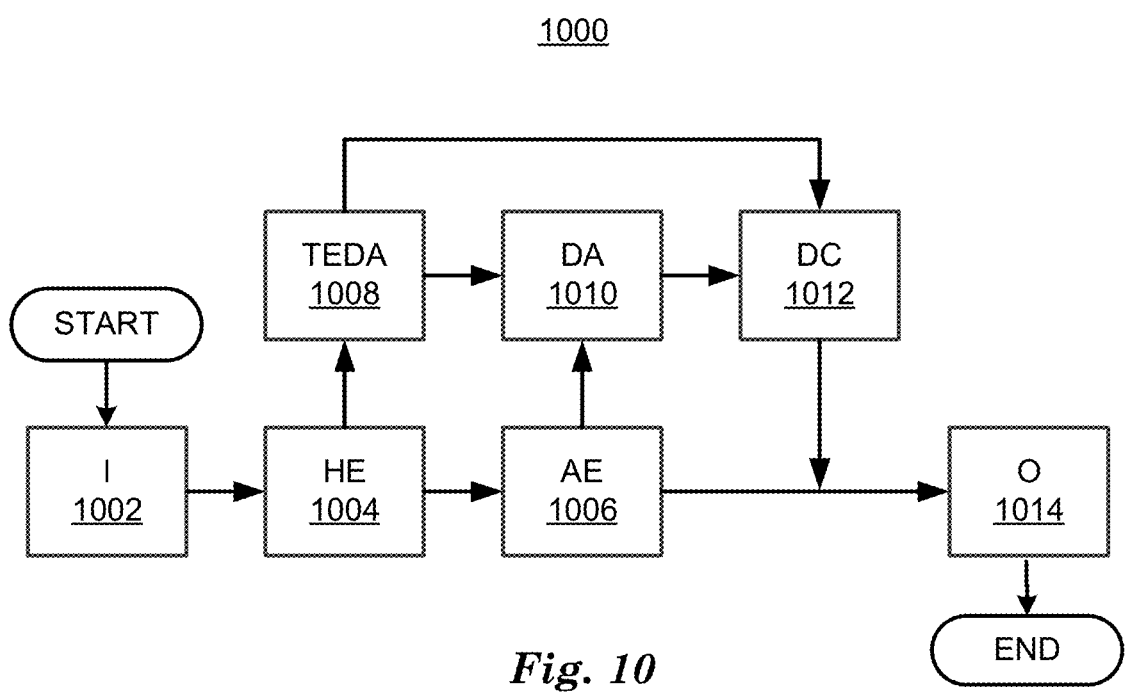
FIG. 10 is a diagram of an example process to stabilize stationary video camera output.

FIG. 10 is a flowchart diagram, described in relation to FIGS. 1-9, of a process 1000 for operating a vehicle based on determining moving objects in a stabilized, drift-corrected image. Process 1000 can be implemented by a processor of computing device 115, taking as input information from sensors 116, and executing commands and sending control signals via controllers 112, 113, 114, for example. Process 1000 includes multiple blocks taken in the disclosed order. Process 1000 also includes implementations including fewer blocks or can include the blocks taken in different orders.

Process 1000 starts at block 1002 (I) where computing device inputs a frame of unstable video stream data $F_{Unst}$ from a stationary video camera 206, where unstable video data is video stream data subject to movement caused by mounting a stationary video camera 206 on a cantilevered pole 218 as discussed in relation to FIGS. 2 and 3, above At block 1004 (HE) computing device 115 performs frame-to-frame homography estimation $H_{Inst}^n$, as discussed above in relation to FIGS. 4 and 5 by performing region-wise matching using normalized correlation, for example. Block 1004 outputs results of homography estimation $H_{Inst}^n$ to both block 1006 (AE) and block 1008 (TEDA).

At block 1006 computing device 115 performs accumulated estimation of instantaneous compensation according to the equation:

$$H_{Acc}^n = \pi_{i=0}^n H_{Inst}^i \quad (6)$$

where $H_{Inst}^n$ refers to the instantaneous compensation at frame i, and $H_{Acc}^n$ refers to the accumulated instantaneous compensation over the last n frames as discussed above in relation to FIGS. 3-8, above.

At block 1008 computing device 115 performs TEDA anomaly detection by detecting periods of low normalized eccentricity c as described above in relation to FIGS. 7 and 8, above. Data regarding stable regions 510 are passed onto block 1010 (DA) and block 1012 (DC).

At block 1010 computing device 115 performs drift approximation where $H_{Correction} = \alpha H_{Drift}$, $H_{Drift}$ stands for the estimated total drift for each parameter measured by homography at block 1104, $H_{Correction}$ stands for the amount of correction to be applied per frame.

At block 1012 (DC) computing device 115 periodically performs drift correction on the image data according to the equation:

$$H_{Acc}^n = H_{Acc}^n + H_{Correction} \quad (7)$$

At block 1014 computing device 115 outputs a stable, drift corrected frame of video data $F_{Stable} = F_{Unst} H_{Acc}^n$. Following block 1014, system 1000 can return to block 1002 to input a new unstable frame of video stream data $F_{Unst}$ from a stationary camera 206 mounted on a cantilevered pole 218.

Figure 11:
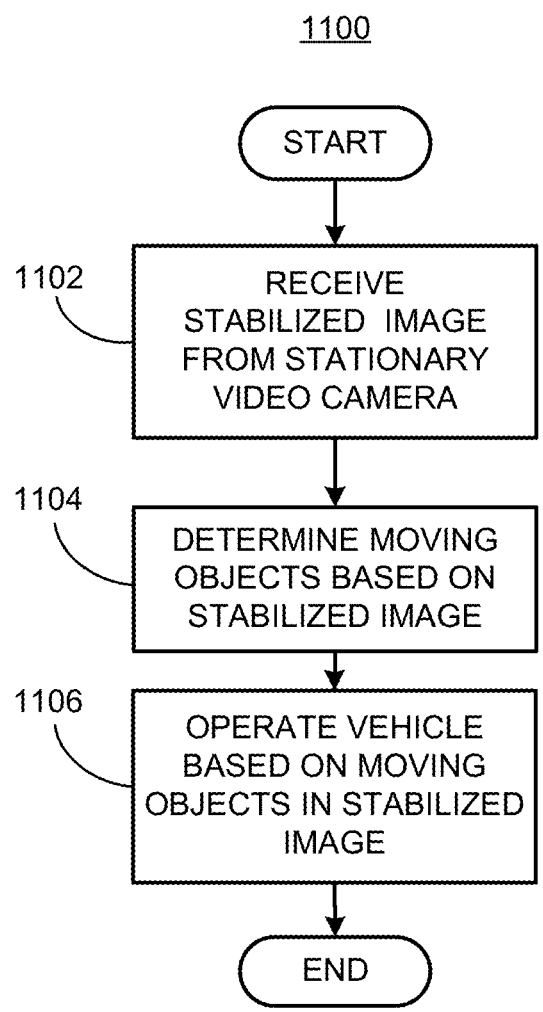
FIG. 11 is a flowchart diagram of an example process to operate a vehicle based on stabilized stationary video camera output.

FIG. 11 is a diagram of a flowchart, described in relation to FIGS. 1-10, of a process 1100 for operating a vehicle based on determining moving objects in a stabilized, drift-corrected image. Process 1100 can be implemented by a processor of computing device 115, taking as input information from sensors 116, and executing commands and sending control signals via controllers 112, 113, 114, for example. Process 1100 includes multiple blocks taken in the disclosed order. Process 1100 also includes implementations including fewer blocks or can include the blocks taken in different orders.

Process 1100 begins at block 1102, in which a computing device 115 included in a vehicle 110 receives a stabilized, drift-corrected eccentricity $\varepsilon_k$ image from a stationary video camera 206. Stabilized, drift-corrected video stream data can be created by computing device 115 executing a process 1000 as described in relation to FIG. 10. As discussed in relation to FIGS. 2 and 3 above, stationary video camera 206 can be included in a traffic infrastructure system that determines when to transmit eccentricity $\varepsilon_k$ image from stationary video camera 206 to vehicle 110 based on vehicle 110 location. A traffic infrastructure system can also transmit eccentricity $\varepsilon_k$ image in response to a query transmitted by vehicle 110 to a traffic infrastructure system via an ad hoc network, for example. In addition to eccentricity $\varepsilon_k$ image, a traffic infrastructure system can transmit pose and field of view information regarding the stationary video camera 206.

At block 1104 computing device 115 can combine an eccentricity $\varepsilon_k$ image with a cognitive map 300 based on combining the location, pose and field of view with information regarding the real-world 3D locations of objects in the field of view to determine moving objects 304, 306, 308, 310 in or near a roadway 302 that a vehicle 110 is traveling on or intending to travel on.

At block 1106 computing device 115 can operate vehicle 110 by determining a path polynomial 314 based on determining free space regions and non-free space regions in a cognitive map 300 and, at least in part, on moving objects 304, 306, 308, 310 as discussed above in relation to FIG. 3, above. Computing device 115 can operate vehicle 110 to travel along the path polynomial 314 by sending commands to controllers 112, 113, 114 to control vehicle 110 steering, braking and powertrain. Following this block process 1100 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
receiving a video data stream, wherein the video data stream is drift-corrected based on determining that an input video data stream is stable based on determining an eccentricity $\varepsilon_k$ at a time k and comparing the eccentricity $\varepsilon_k$ to an empirically determined threshold value, where eccentricity $\varepsilon_k$ measures a rate at which data points associated with a pixel location $x_k$ are changing as a function of time k, and then applying drift correction to maintain a stabilized field of view, wherein the field of view is stabilized with respect to real world coordinates; and
operating a vehicle based on determining at least one moving object in a stabilized image stream.

2. The method of claim 1, wherein the eccentricity $\varepsilon_k$ is based on recursively processing the input video data stream based on an empirically determined constant $\alpha$, an input video data stream data point at time k $x_k$, a mean of $x_k$ at time k $\mu_k$, and variance of $x_k$ at time k $\sigma_k^2$.

3. The method of claim 2, further comprising determining the moving object in the stabilized video data stream based on determining eccentricity $\varepsilon_k$ and comparing eccentricity $\varepsilon_k$ to a constant proportional to $\alpha$.

4. The method of claim 2, further comprising determining eccentricity $\varepsilon_k$ based on recursively updating mean $\mu_k$ based on a previous mean $\mu_{k-1}$ and weighted video data stream data points $\alpha x_k$ that assign decreasing weights to older video data stream data points $x_k$.

5. The method of claim 2, further comprising determining eccentricity $\varepsilon_k$ based on recursively updating variance $\sigma_k^2$ for video data stream data points based on the constant $\alpha$, the input video data stream data point $x_k$, and the mean $\mu_k$.

6. The method of claim 1, wherein operating the vehicle based on determining at least one moving object in the video data stream includes determining a 3D location of the moving object with respect to the vehicle.

7. The method of claim 6, wherein the video data stream is acquired by a stationary video camera and determining the 3D location of the moving object with respect to the vehicle includes determining a location and a direction of the stationary video camera with respect to the vehicle.

8. The method of claim 7, wherein determining location and a direction of the stationary video camera with respect to the vehicle includes determining a 3D pose of the stationary video camera.

9. A system, comprising a processor; and
a memory, the memory including instructions to be executed by the processor to:
receive a video data stream, wherein the video data stream is drift-corrected based on determining that an input video data stream is stable based on determining an eccentricity $\varepsilon_k$ at a time k and comparing the eccentricity $\varepsilon_k$ to an empirically determined threshold value, where eccentricity $\varepsilon_k$ measures a rate at which data points associated with a pixel location $x_k$ are changing as a function of time k, and then applying drift correction to maintain a stabilized field of view, wherein the field of view is stabilized with respect to real world coordinates; and
operate a vehicle based on determining at least one moving object in a stabilized video data stream.

10. The system of claim 9, wherein the eccentricity $\varepsilon_k$ is based on recursively processing the input video data stream based on an empirically determined constant $\alpha$, an input image stream data point at time k $x_k$, a mean of $x_k$ at time k $\mu_k$, and variance of $x_k$ at time k $\sigma_k^2$.

11. The system of claim 10, the instructions further comprising instructions to determine the moving object in the stabilized video data stream based on determining eccentricity $\varepsilon_k$ and comparing eccentricity $\varepsilon_k$ to a constant proportional to $\alpha$.

12. The system of claim 10, the instructions further comprising instructions to determine eccentricity $\varepsilon_k$ based on recursively updating mean $\mu_k$ based on a previous mean $\mu_{k-1}$ and weighted stationary video data stream data points $\alpha x_k$ that assign decreasing weights to older stationary video data stream data points $x_k$.

13. The system of claim 10, the instructions further comprising instructions to determine eccentricity $\varepsilon_k$ based on recursively updating variance $\sigma_k^2$ for stabilized video data stream data points based on the constant $\alpha$, the input video data stream data point $x_k$, and the mean $\mu_k$.

14. The system of claim 9, wherein operating the vehicle based on determining at least one moving object in the stabilized video data stream includes determining a 3D location of the moving object with respect to the vehicle.

15. The system of claim 14, wherein the stationary video data stream is acquired by a stationary video camera and determining the 3D location of the moving object with respect to the vehicle includes determining a location and a direction of the stationary video camera with respect to the vehicle.

16. The system of claim 15, wherein determining location and a direction of the stationary video camera with respect to the vehicle includes determining a 3D pose of the stationary video camera.

17. A system, comprising:
means for controlling vehicle steering, braking, and powertrain; and
computer means for:
receiving a stabilized video data stream, wherein the stabilized video data stream is drift-corrected based on determining that an input video data stream is stable based on determining an eccentricity $\varepsilon_k$ at a time k and comparing the eccentricity $\varepsilon_k$ to an empirically determined threshold value, where eccentricity $\varepsilon_k$ measures a rate at which data points associated with a pixel location $x_k$ are changing as a function of time k, and then applying drift correction to maintain a stabilized field of view, wherein the field of view is stabilized with respect to real world coordinates; and
operating a vehicle based on determining at least one moving object in a stabilized image stream and the means for controlling vehicle steering, braking, and powertrain.

* * * * *